United States Patent [19]
Kashida et al.

[11] Patent Number: 5,864,409
[45] Date of Patent: Jan. 26, 1999

[54] IMAGE PROCESSING SYSTEM PROVIDING ACCESS TO DATA PROCESSING

[75] Inventors: Motokazu Kashida, Musashino; Yasutomo Suzuki; Nobukuni Roppongi, both of Yokohama; Masayuki Ochi, Hino, all of Japan

[73] Assignee: Canon Kabushiki Kaisha, Tokyo, Japan

[21] Appl. No.: 906,154

[22] Filed: Aug. 5, 1997

Related U.S. Application Data

[63] Continuation of Ser. No. 506,623, Jul. 25, 1995, abandoned.

[30] Foreign Application Priority Data

Jul. 29, 1994 [JP] Japan ............................. 178923/1994

[51] Int. Cl.$^6$ ............................. H04N 1/32; B41B 15/00
[52] U.S. Cl. ........................ 358/468; 358/442; 358/479; 395/114; 395/200.77
[58] Field of Search ..................... 358/403, 404, 358/426, 443, 448, 523, 524, 539, 442, 434, 479; 348/385, 460, 552, 568; 395/111, 112, 114, 115, 652, 653, 200.42, 200.77; 382/232, 233, 234

[56] References Cited

U.S. PATENT DOCUMENTS

| | | | |
|---|---|---|---|
| 4,772,956 | 9/1988 | Roche et al. | 358/433 |
| 5,130,792 | 7/1992 | Tindell et al. | 358/85 |
| 5,325,423 | 6/1994 | Lewis | 379/90 |
| 5,418,713 | 5/1995 | Allen | 364/403 |
| 5,464,946 | 11/1995 | Lewis | 84/609 |
| 5,488,411 | 1/1996 | Lewis | 348/8 |
| 5,497,204 | 3/1996 | Ko | 358/479 |
| 5,499,113 | 3/1996 | Tsuboi et al. | 358/479 |
| 5,566,278 | 10/1996 | Patel et al. | 395/114 |
| 5,635,979 | 6/1997 | Kostreski et al. | 348/13 |
| 5,721,815 | 2/1998 | Ottesen et al. | 395/200.09 |

Primary Examiner—Kim Yen Vu
Assistant Examiner—Madeleine Av Nguyen
Attorney, Agent, or Firm—Fitzpatrick, Cella, Harper & Scinto

[57] ABSTRACT

An image processing system includes a first image processing apparatus connected to a second image processing apparatus Each apparatus includes a programmable data compressor that performs image data compression in accordance with at least two data compression programs. The first image processing apparatus is able to request the second image processing apparatus to transmit to it a compression program stored by said second processing apparatus, which the first image processing apparatus may then use in its own data compressor.

38 Claims, 3 Drawing Sheets

IMAGE PROCESSING SYSTEM PROVIDING ACCESS TO DATA PROCESSING

This application is a continuation of application Ser. No. 08/506,623 filed Jul. 25, 1995 now abandoned.

FIELD OF THE INVENTION

This invention relates to a system including a plurality of remotely connected image processing apparatuses.

BACKGROUND OF THE INVENTION

Conventional communicating apparatuses that compress data to be transmitted, e.g. image data, and transmit the compressed data to a communication partner are readily available, with facsimile apparatus being one well known example.

In such apparatuses, many different coding methods can be used for compressing the image data. For example, entropy encoding has been frequently used and, recently, variable length coding methods have been developed that are suitable for compressing multivalue image data. Two existing methods are the JPEG and MPEG methods. Digital VTRs, color copy machines, and color facsimiles all use such coding methods, with each type of apparatus using a method whose characteristics are most suited to its purpose.

However, because each type of apparatus operates best with a particular coding method, there can be problems when data encoded according to one method is sent to an apparatus best suited to another method. For example, image data generated by the color image reader of a color copying apparatus may be transmitted through a motion picture image network, e.g., a CATV network, to a digital VTR. In such case, either the encoded data is not easily decoded, or else a characteristic of the encoder in the color image reader has to be adjusted to provide the encoding method used in the digital VTR.

Such an adjustment can be troublesome and complicated, both in its technical aspects and in the burden it may place on the user of the color copying apparatus.

OBJECTS OF THE INVENTION

An object of the present invention is to provide an image processing system that solves the above-identified problem.

Another object of the present invention is to improve the adaptation of plural image processing apparatuses within an image processing system.

Yet another object of the present invention is to provide an image processing apparatus that is able to compress image data by various methods.

The foregoing and still other objects and advantages of the present invention will become fully apparent from the following description to be taken in conjunction with attached drawings.

DETAILED DESCRIPTION OF THE PRESENT INVENTION

Figure 1:
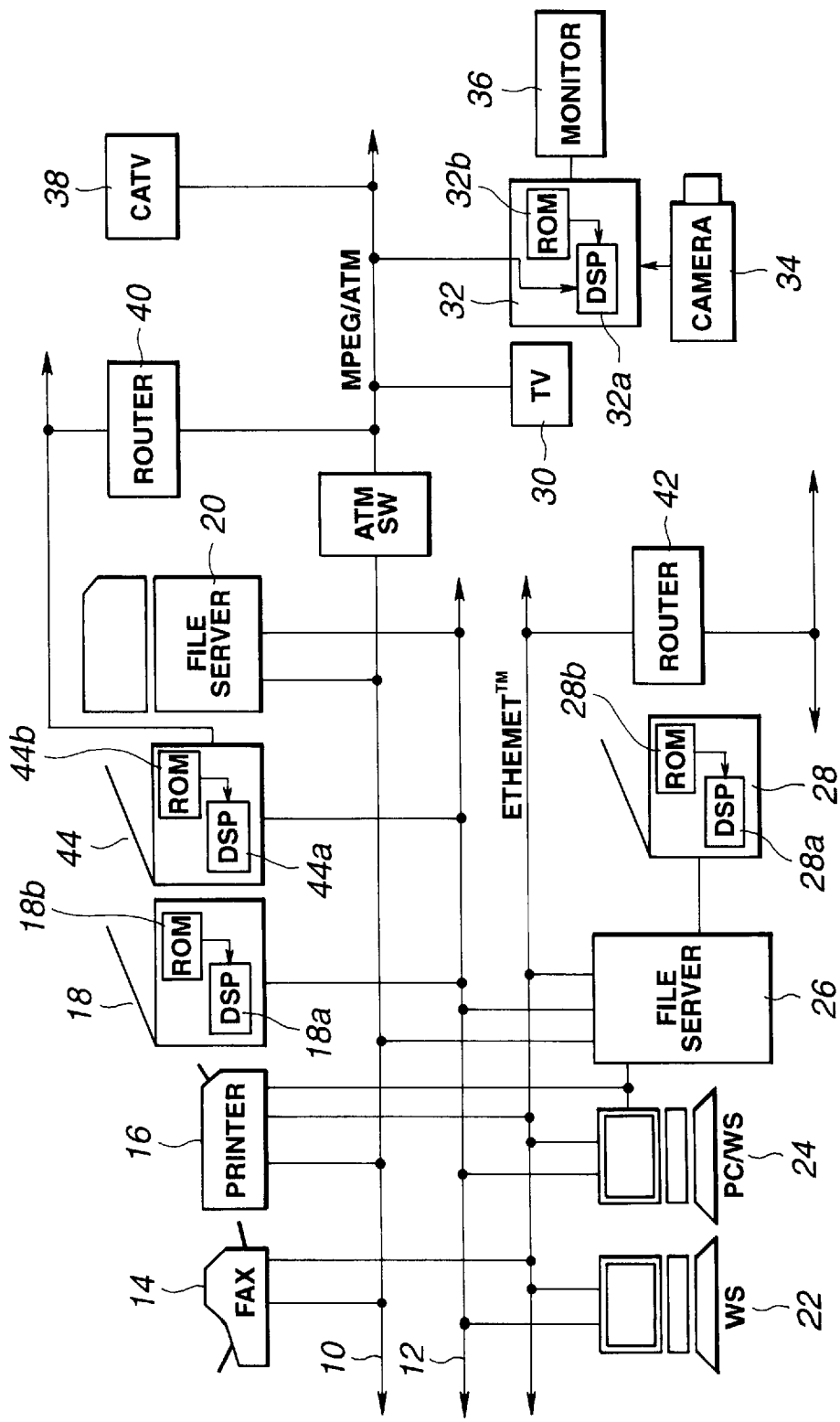
FIG. 1 is a block diagram of an embodiment of the present invention.

FIG. 1 is a block diagram that shows the construction of a preferred embodiment of the present invention. Referring to FIG. 1, an ATM asynchronous transfer mode) network 10 transfers data in an ATM mode a LAN 12 (local area network), e.g. the Ethernet™, transfers data in a second mode different from the ATM mode. A facsimile apparatus 14 is connected to ATM network 10 and has image coding/decoding functions. A color printer 16, including a page memory, produces a permanent visible image based on image data decoded from coded image data. Color printer 16 is replaceable by a monochrome printer. A color copy machine 18 includes a color image reader and a color printer, and further includes a data compressor 18a that compresses image data generated by the color image reader, a ROM 18b, a page memory in which compressed image data is written and an expander that expands compressed image data. Data compressor 18a in turn comprises a programmable DSP (digital signal processor).

A file server 20 stores image data inputted through ATM network 10. A WS (work station) 22 inputs data to file server 20 or outputs data therefrom. A PC (personal computer) 24 connects the ETHERNET and LAN 12. A second file server 26 is similar to file server 20 but is connected to a second color copy machine 28 similar to the first color copy machine 18, having a data compressor 28a and a ROM 28b. A digital television set 30 is connected to ATM network 10. Digital TV 30 can expand MPEG or JPEG coded data and display an image corresponding to the coded data. Digital TV 30 can be either a CAT type TV or flat panel display system, e.g. a ferroelectric liquid crystal display panel.

A VTR 32 can digitally record JPEG or MPEG coded data on a magnetic tape, expand such coded data and record decoded data by an analog method. VTR 32 includes compressor 32a that compresses input image data according to JPEG or MPEG standards. VTR 32 is connected to a high definition camera 34 and display monitor 36, which is an example of an image output device.

A CATV station 38 broadcasts MPEG or JPEG coded data or other kinds of broadcast data through ATM network 10.

A first router 40 connects ATM network 10 with other networks, while a second router 42 connects LAN 12 with other networks. A color copy machine 44 that is similar to color copy machine 18 is connected to the LAN 12 and includes a data compressor 44a and a ROM 44b. ATM network switches (not shown) are provided between facsimile 14 and ATM network 10, between printer 16 and LAN 10 and between color copy machine 18 and LAN 10.

Compressor 18a of color copy machine 18, compressor 28a of color copy machine 28, compressor 32a of VTR 32 and compressor 44a of color copy machine 44 each include a digital signal processor (DSP). The DSPs can change their compression characteristics by changing the compression software programs loaded in them. These compression software programs, having suitable characteristics for the various apparatus, are stored in the respective ROMs.

For instance, a high speed compression algorithm is stored in ROM 32b, because compressor 32a has to compress moving image data that is high speed data. A different compression algorithm, suitable for handling large amounts of data for high quality color reproduction, is stored in ROMs 18b, 28b, 44b.

The operation of the present embodiment will now be explained. In this embodiment, color image data that is produced by camera 34 is transferred to color copy machine 18 or 28 which prints out an image based on the color image data.

In this case the DSP of compressor 32a operates not in accordance with a program stored in ROM 32b, but rather in accordance with a program stored in ROM 18a or ROM 28a of color copy machine 18 or 28. Specifically, VTR 32 requests the reading out of a desired compression algorithm stored in ROM 18b or 28b through the network. In response to that request, color copy machine 18 or 28 reads out the compression algorithm stored in ROM 18b or 28b and transmits it to VTR 32 through the network by a packet transmission method. VTR 32 then loads the algorithm into the DSP of its own compressor 32.

Figure 2:
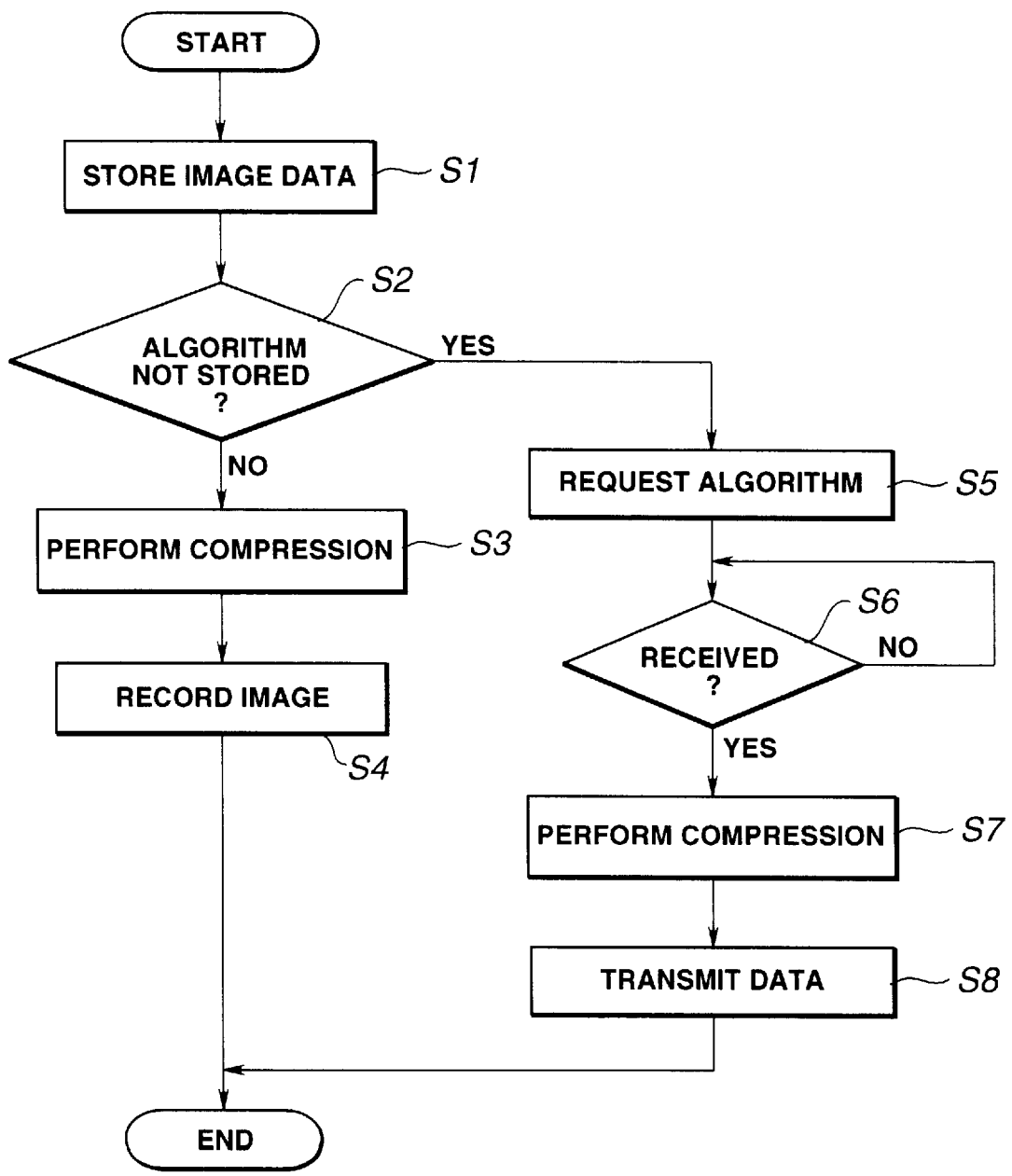
FIG. 2 is a flowchart showing the operation of VTR 32 shown in FIG. 1.

FIG. 2 is a flowchart of the operation VTR 32 shown in FIG. 1. Referring to FIG. 2, image data to be compressed, e.g. image data from camera 34 or LAN 10, is stored in an internal memory of VTR 32 (S1). The method then discriminates whether VTR 32 is able to perform a given compression algorithm by itself or not.

In other words, it discriminates whether it stores a program for this compression algorithm or whether it is necessary for VTR 32 to request the compression algorithm from another apparatus (S2).

If VTR 32 is able to perform the given compression algorithm by itself, VTR 32 reads out the compression algorithm from ROM 32b, loads it into the DSP of its compressor 32a and performs compression coding on the image data (S3). VTR 32 then records the image data compressed by the compressor 32a on a magnetic tape internal memory (S4) (not illustrated).

If VTR 32 is not able to perform the given compression method by itself, for instance in a case where VTR 32 has to perform a compression method normally used in color copy machines, VTR 32 sends a request for the desired compression algorithm to an apparatus that has the compression algorithm through the network 10 or 12 (S5). In this case, one or all of color copy machines 18, 28, 44 may be sent the request for the compression algorithm and send out the requested compression algorithm in response.

VTR 32 determines whether it has received the compression algorithm completely or not (S6). The VTR 32 loads the received algorithm into the DSP of its compressor 32a and causes the DSP to compress image data according to this algorithm (S7). VTR 32 then transmits the image data coded by compressor 32a to a designated one of color copy machines 18 and 28 (S8).

According to the present embodiment, VTR 32 is able to perform a compression operation that otherwise would have been impossible for it, e.g. a compression method that is specialized for color copy machines and not stored in VTR 32.

In the present embodiment, a compression method specialized for color copy machines is used. Of course, in accordance with the present invention, other compression methods may be, e.g., compression methods specialized for color facsimiles, color printers, digital still cameras etc. Other types of processing algorithms may also be used.

Figure 3:
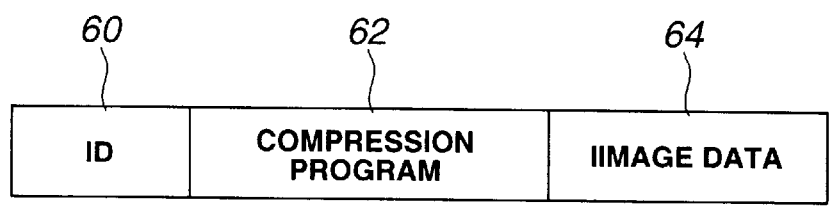
FIG. 3 is a diagram of a transmission format combining image data and a compression algorithm.

In the illustrated embodiment, the image inputting step (S1) is performed separately from the steps receiving the compression algorithm (S5, S6). However, as shown in the format of FIG. 3, it is possible to combine the image data 64 with a compression algorithm 62 and an ID 60 and to transmit the combined data from one apparatus to another through the networks. The apparatus receiving the combined data then compresses the image data 64 according to the compression algorithm 62. This embodiment is advantageous, for example, when the performance of the compressor of the receiver is higher than that of the transmitter.

According to the present invention, data compression methods corresponding to various kinds of data compression are possible.

The individual components shown in outline or designated by blocks in the drawings are all well-known in the image processing arts and their specific construction and operation are not critical to the operation or best mode for carrying out the invention.

While the present invention has bene described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. An image processing system comprising:
    a first image processing apparatus including a first data compressor that compresses image data; and
    a second image processing apparatus connected to said first image processing apparatus and including a second data compressor that compresses image data,
    wherein said first image processing apparatus uses said second data compressor to compress image data in mutual communication between said first image processing apparatus and the second image processing apparatus.

2. An image processing system according to claim 1, wherein each said first and second data processor is a digital signal processor.

3. An image processing system according to claim 1, wherein said first image processing apparatus is a digital copy machine.

4. An image processing system according to claim 1, wherein said second image processing apparatus is a video tape recorder.

5. An image processing system according to claim 1, wherein each of said first and second data compressors includes a data processor for processing data in accordance with first and second data compressing programs.

6. An image processing system according to claim 5, wherein the first data compressing program is stored in said first image processing apparatus and the second data compressing program is stored in said second image processing apparatus, wherein said second image processing apparatus further includes means for transmitting the second data compressing program, and wherein said first image processing apparatus further includes means for receiving the second data compressing program.

7. An image processing system according to claim 6, wherein said transmitting means transmits the second data compressing program through a network.

8. An image processing system according to claim 7, wherein the network is a local area network.

9. An image processing apparatus comprising:
    a data compressor for compressing image data in accordance with a data compression program;
    storing means for storing the program;
    means for receiving, from a partner apparatus, a request for transmission of the program in order to enable the partner apparatus to compress image data in accordance with the program; and
    means for transmitting the program in accordance with the request.

10. An image processing apparatus according to claim 9, wherein said data compressor includes a data processor for processing data in accordance with the program.

11. An image processing apparatus according to claim 9, further comprising generating means for generating image data.

12. An image processing apparatus according to claim 11, wherein said generating means comprises converting means for converting an image into an electrical signal.

13. An image processing apparatus according to claim 11, further comprising means for printing an image based on image data generated by said generating means.

14. An image processing apparatus connected through a network to a communication partner comprising:

a data compressor for compressing image data in accordance with first and second data compression programs;

storing means for storing the first data compression program; and means for sending, through the network, a request to the communication partner to transmit the second data compression program to said apparatus to enable said apparatus to compress image data in accordance with the second data compression program.

15. An image processing apparatus according to claim 14, wherein said data compressor includes a data processor for processing data in accordance with the first and second data compressing programs.

16. An image processing apparatus according to claim 14, further comprising means for receiving the second data compression program through the network.

17. An image processing apparatus according to claim 16, wherein said data compressor compresses the image data in accordance with the second data compression program received by said receiving means.

18. An image processing apparatus according to claim 16, further comprising image data receiving means for receiving image data to be compressed through the network.

19. An image processing apparatus according to claim 18, wherein said data processor compresses the image data received by said image data receiving means.

20. An image processing method comprising the step of:

providing a first image processing apparatus including a first data compressor that compresses image data; and providing a second image processing apparatus connected to the first image processing apparatus and including a second data compressor that compresses image data, and compressing image data by the first image processing apparatus, wherein the first image processing apparatus uses the second data compressor to compress image data in mutual communication between the first image processing apparatus and the second image processing apparatus.

21. An image processing method according to claim 20, wherein each of the first and second data processors is a digital signal processor.

22. An image processing method according to claim 20, wherein the first image processing apparatus is a digital copy machine.

23. An image processing method according to claim 20, wherein the second image processing apparatus is a video tape recorder.

24. An image processing method according to claim 20, wherein each of the first and second data compressors includes a data processor for processing data in accordance with first and second data compressing programs.

25. An image processing method according to claim 24, wherein the first data compressing program is stored in the first image processing apparatus and the second data compressing program is stored in the second image processing apparatus, wherein the second image processing apparatus further includes means for transmitting the second data compressing program, and wherein the first image processing apparatus further includes means for receiving the second data compressing program.

26. An image processing method according to claim 25, further comprising a step of transmitting, by the transmitting means, the second data compressing program through a network.

27. An image processing method according to claim 26, wherein the network is a local area network.

28. An image processing method comprising the steps of:

compressing image data in a data compressor in accordance with a data compression program;

storing the program;

receiving, from a partner apparatus, a request for transmission of the program in order to enable the partner apparatus to compress image data in accordance with the program; and transmitting the program in accordance with the request.

29. An image processing method according to claim 28, wherein the data compressor includes a data processor for processing data in accordance with the program.

30. An image processing method according to claim 28, further comprising a generating step of generating image data.

31. An image processing apparatus according to claim 30, wherein said generating step includes a converting step of converting an image into an electrical signal.

32. An image processing method according to claim 30, further comprising a printing step of printing an image based on image data generated in said generating step.

33. An image processing method operative in an image processing apparatus connected through a network to a communication partner comprising:

compressing image data in a data compressor in accordance with first and second data compression programs;

storing the first data compression program; and sending, through the network, a request to the communication partner to transmit the second data compression program to the apparatus to enable the apparatus to compress image data in accordance with the second data compression program.

34. An image processing method according to claim 33, wherein the data compressor includes a data processor for processing data in accordance with the first and second data programs.

35. An image processing method according to claim 33, further comprising a receiving step of receiving the second data compression program through the network.

36. An image processing method according to claim 35, wherein said compressing step compresses the image data in accordance with the second data compression program received in said receiving step.

37. An image processing method according to claim 35, further comprising an image data receiving step of receiving image data to be compressed through the network.

38. An image processing method according to claim 37, wherein said data processing step compressed the image data received in said image data receiving step.

* * * * *

UNITED STATES PATENT AND TRADEMARK OFFICE
CERTIFICATE OF CORRECTION

PATENT NO. : 5,864,409

DATED : January 26, 1999

INVENTOR(S) : MOTOKAZU KASHIDA, ET AL.

It is certified that error appears in the above-identified patent and that said Letters Patent is hereby corrected as shown below:

<u>IN THE DRAWINGS</u>

Sheet 3, FIG. 3, "IIMAGE" should read --IMAGE--.

<u>COLUMN 2</u>

Line 1, "asynchronous" should read --(asynchronous--.

<u>COLUMN 4</u>

Line 5, "bene" should read --been--.

<u>COLUMN 6</u>

Line 30, "apparatus" should read --method--.

Signed and Sealed this

Seventh Day of December, 1999

Attest:

Q. TODD DICKINSON

Attesting Officer

Acting Commissioner of Patents and Trademarks